United States Patent
McIntyre (10) Patent No.: US 11,226,041 B2
(45) Date of Patent: Jan. 18, 2022

(54) KNIFE GATE VALVE WITH DEAD-END SERVICE

(71) Applicant: DeZURIK, Inc., Sartell, MN (US)

(72) Inventor: Rory McIntyre, Sartell, MN (US)

(73) Assignee: DeZURIK, Inc., Sartell, MN (US)

( * ) Notice: Subject to any disclaimer, the term of this patent is extended or adjusted under 35 U.S.C. 154(b) by 0 days.

(21) Appl. No.: 16/433,880

(22) Filed: Jun. 6, 2019

(65) Prior Publication Data

US 2019/0376603 A1    Dec. 12, 2019

Related U.S. Application Data

(60) Provisional application No. 62/681,385, filed on Jun. 6, 2018.

(51) Int. Cl.
*F16K 3/02*        (2006.01)

(52) U.S. Cl.
CPC .......... *F16K 3/0272* (2013.01); *F16K 3/0227* (2013.01)

(58) Field of Classification Search
CPC .... F16K 3/0227; F16K 3/0236; F16K 3/0245; F16K 3/0272; F16K 3/0281; F16K 27/044; F16K 27/105
See application file for complete search history.

(56) References Cited

U.S. PATENT DOCUMENTS

| | | | |
|---|---|---|---|
| 2,636,713 A * | 4/1953 | Hamer | F16K 27/047 137/315.31 |
| 3,301,523 A * | 1/1967 | Lowrey | F16K 5/0673 251/172 |
| 3,334,653 A | 8/1967 | Works et al. | |
| 5,014,730 A | 5/1991 | Fye | |
| 5,582,200 A | 12/1996 | Kimpel et al. | |
| 5,836,570 A | 11/1998 | Blenkush | |
| 6,817,593 B2 | 11/2004 | Kato et al. | |
| 7,458,559 B2 | 12/2008 | Blenkush | |
| 8,403,298 B2 | 3/2013 | Nguyen | |
| 8,840,085 B2 | 9/2014 | Choo et al. | |

(Continued)

FOREIGN PATENT DOCUMENTS

CA        2921328        8/2017

OTHER PUBLICATIONS

International Search Report and Written Opinion for PCT Application No. PCT/US2019/035834 dated Sep. 19, 2019 (12 pages).

(Continued)

*Primary Examiner* — Hailey K. Do
(74) *Attorney, Agent, or Firm* — Pauly, DeVries Smith & Deffner LLC (57) ABSTRACT

A knife gate valve with an interior channel divided by an interior channel configured to receive a valve gate, the valve gate can travel along the interior channel. A removable first wear ring is disposed on the upstream side of the interior channel, the first wear ring substantially lining the upstream side of the interior channel; and a removable second wear ring disposed on the downstream side of the interior channel, the second wear ring substantially lining the downstream side of the interior channel; a first retainer ring adjacent to the gate on the upstream side of the valve; and a second retainer ring adjacent to the gate on the downstream side of the valve is disclosed. Other embodiments are also shown.

18 Claims, 9 Drawing Sheets

(56) References Cited

U.S. PATENT DOCUMENTS

| | | |
|---|---|---|
| 9,121,514 B2 | 9/2015 | Blenkush et al. |
| 2008/0017825 A1 | 1/2008 | Blenkush |
| 2009/0095932 A1* | 4/2009 | Leblanc ............... F16K 3/0281 |
| | | 251/326 |
| 2010/0200793 A1 | 8/2010 | Nguyen |
| 2017/0299067 A1 | 10/2017 | Nguyen et al. |
| 2017/0299069 A1 | 10/2017 | Nguyen et al. |

OTHER PUBLICATIONS

International Preliminary Report on Patentability for PCT Application No. PCT/US2019/035834 dated Dec. 17, 2020 (8 pages).

* cited by examiner

KNIFE GATE VALVE WITH DEAD-END SERVICE

This application is a non-provisional application claiming priority to U.S. Provisional Application No. 62/681,385, filed Jun. 6, 2018, and the entire contents are incorporated herein by reference.

FIELD OF THE INVENTION

The present application is directed to valves, including to knife gate valves that allow for dead-end service.

BACKGROUND

Gate valves are used in various industrial applications in which a fluid is transported. In some applications, the interior surfaces of the valve components are exposed to abrasive or corrosive materials that can rapidly degrade all but the most durable of materials. For example, mining slurries with significant amounts of rock and sand can rapidly wear away valve components. Wear rings can be provided to line the inside surfaces of the valve so that abrasive or corrosive materials do not come in contact with portions of the valve interior. The wear rings can be manufactured from highly durable materials and then replaced when they become worn out.

Some gate valves are configured such that, when the gate is closed, one side of the valve can be pressurized by, for example, a fluid pressing on one side of the gate. The opposite side of the valve can be at a lower pressure, for example at atmospheric pressure. This allows fluid to be drained from the downstream side of the valve while the upstream side of the valve still contains fluid. The valve maintains a seal so that fluid from the upstream side does not pass through to the downstream side of the valve. This function is sometimes called "dead-end service" because the valve provides a dead end to the flow of fluid through the valve.

SUMMARY

The disclosed technology provides a knife gate valve that includes retainer rings for providing dead-end service. In certain embodiments the valve includes a valve body with an interior channel, a knife gate that slides through the body in and out of the interior channel, wear rings on the upstream and downstream sides of the valve, and retainer rings disposed adjacent to the gate on the upstream and downstream sides.

The retainer rings provide dead-end service when the upstream side of the gate is pressurized by contacting and retaining the gate, transferring forces from the gate to the valve body. Specifically, when the gate is closed, the upstream side of the valve can contain fluid while the downstream side of the valve does not contain fluid. When this occurs, the fluid exerts pressure on the upstream side of the gate, which urges the gate toward the downstream side of the valve body. The downstream retainer ring provides a hard stop that resists the force of the gate, transferring this force to valve body.

In an example embodiment a knife gate valve comprising a valve body having an interior channel through which fluids can flow, the interior channel divided by an interior channel configured to receive a valve gate, the valve gate configured to travel along the interior channel to open and close the interior channel to fluid flow; the valve gate defining an upstream side of the interior channel and a downstream side of the interior channel; a movable gate disposed in the interior channel; a removable first wear ring disposed on the upstream side of the interior channel, the first wear ring substantially lining the upstream side of the interior channel; and a removable second wear ring disposed on the downstream side of the interior channel, the second wear ring substantially lining the downstream side of the interior channel; a first retainer ring adjacent to the gate on the upstream side of the valve; and a second retainer ring adjacent to the gate on the downstream side of the valve.

In some examples, the valve is configured such that retainer rings engage the gate so that the wear rings do not contact the gate to provide dead-end service. This can be accomplished, for example, by providing retainer rings that extend farther into the interior of the valve body than the wear rings. In the retainer rings have a smaller gap between them than the gap between the wear rings.

In some examples, the wear rings can be provided with a flange disposed on the outer face of the wear rings that engage the outer face of the valve body to prevent the wear rings from sliding into the interior of the valve body to contact the gate. In this manner the wear rings can only enter into the valve body a set distance, thereby not entering far enough to obstruct the path of the gate of the knife gate valve.

In some examples, the retainer rings prevent the gate from contacting the valve body, thus preventing unnecessary wear to the valve body, which can be difficult and expensive to replace. The retainer rings are removable and replaceable if they wear out. In some examples, the retainer rings are positioned in the interior channel between the valve body and the gate.

In some examples, the disclosed technology also includes one or more seals on the upstream and downstream sides of the valve that prevent leakage of fluid through the valve. An edge of the seal engages the gate. The seal can be, for example, a resilient seat, also called herein a "T-seat", to characterize a general cross-sectional shape of the seat. In some examples, the T-seat sits in a groove provided in the wear ring. In some examples, the T-seat abuts the retainer ring. In some examples, the T-seat is situated between the wear ring and the retainer ring such that the wear ring and retainer ring do not touch. Additional seals such as O-rings can be included.

In some examples, the dead-end rings are retained in the valve by one or more tabs machined in the valve body. The tabs can be positioned inside of the interior channel. In some examples, the dead-end rings have a groove that engages the tabs. In alternative examples, the dead-end rings do not have a groove.

With regard to dead-end service, the valve can be produced so as to satisfy the requirements of ASME B16.34, including under section 6.6.1. Alternatively, dead end service refers a valve that can hold full line pressure at the end of a pipeline without a flange or piping attached to the valve.

It should be understood that the terms "upstream" and "downstream" are used for convenience to indicate a direction of fluid flow through the valve. When the gate is closed, the upstream side of the valve can contain fluid while the downstream side of the valve does not contain fluid, the fluid is not under pressure, or the downstream side is open to atmosphere—in other words. However, neither side of the valve is inherently an upstream or downstream side because fluid can flow in either direction through the valve. As used herein, an "upstream" side of the valve may be pressurized by fluid, and a "downstream" side of the valve may be open to atmosphere or not have pressurized fluid, but this is merely a convention.

In an embodiment, a knife gate valve is included having a valve body having an interior channel through which fluids can flow, the interior channel divided by an interior channel configured to receive a valve gate, the valve gate configured to travel along the interior channel to open and close the interior channel to fluid flow; the valve gate defining an upstream side of the interior channel and a downstream side of the interior channel; a movable gate disposed in the interior channel; a removable first wear ring disposed on the upstream side of the interior channel, the first wear ring substantially lining the upstream side of the interior channel; and a removable second wear ring disposed on the downstream side of the interior channel, the second wear ring substantially lining the downstream side of the interior channel; a first retainer ring adjacent to the gate on the upstream side of the valve; and a second retainer ring adjacent to the gate on the downstream side of the valve.

In an embodiment, wherein the first and second retainer rings are configured to provide dead-end service to the valve such that an upstream side of the valve is under pressure and the downstream side of the valve is open to atmosphere.

In an embodiment, wherein the second wear ring is removable from the valve without removal of a retainer ring.

In an embodiment, wherein the first wear ring further includes an outward-facing flange configured to prevent the first wear ring from touching the gate.

In an embodiment, wherein the interior channel further includes at least one tab.

In an embodiment, wherein the first retainer ring is seated along a first sidewall of the interior channel and the second retainer ring is seated along a second sidewall of the interior channel.

In an embodiment, further can include a first seal disposed between the first wear ring and the first retainer ring, wherein the first seal isolates the first wear ring from the first retainer ring.

In an embodiment, wherein at least one of the first retainer ring and second retainer ring are retained in the interior channel by at least one tab disposed between the retainer ring and the gate.

In an embodiment, further can include a first T-seat situated between the first wear ring and the first retainer ring and a second T-seat situated between the second wear ring and the second retainer ring.

In an embodiment, a knife gate valve is included having a valve body having: a center bore with a center bore surface, the center bore enclosing a fluid flow path through the valve body, and an interior channel in the valve body, the interior channel having a channel surface and first and second annular sidewalls; a knife gate configured to be received into the interior channel of the valve body; a wear ring disposed inside the center bore, the wear ring providing a barrier between the center bore surface and the fluid flow path; and a retainer ring having an outer face abutting one of the first and second annular sidewalls of the interior channel, and an inner face that abuts the gate when the gate is in a closed position.

In an embodiment, further can include a seal, wherein the seal is a T-seat that is seated in a groove in an exterior annular surface of the wear ring.

In an embodiment, wherein the seal is a T-seat that is positioned between the wear ring and the retainer ring such that the wear ring and the retainer ring do not touch.

In an embodiment, wherein the knife gate valve includes a first retainer ring and a first wear ring on an upstream side of the gate and a second retainer ring and a second wear ring on a downstream side of the gate.

In an embodiment, wherein the wear ring further includes a flange on an outer face of the wear ring, and wherein the flange abuts an outer face of the valve body to prevent the wear ring from advancing toward the gate.

In an embodiment, wherein the center bore surface engages an exterior annular surface of the wear ring.

In an embodiment, wherein the wear ring has an interior annular surface defining a uniform inner radius of the wear ring and an exterior annular surface defining a non-uniform outer radius of the wear ring.

In an embodiment, wherein the channel surface includes an annular portion, a first planar portion adjacent to the annular portion, and a second planar portion adjacent to the annular portion.

In an embodiment, wherein the retainer ring has an exterior annular surface defining at least one groove.

In an embodiment, wherein the wear ring further includes: an annular seating surface that abuts the center bore surface, and a groove in the annular seating surface configured to retain a seal between the annular seating surface and the center bore surface.

In an embodiment, wherein the retainer ring is positioned on a downstream side of the valve, and the inner face of the retainer ring is configured to counter a force of the knife gate surface pressing on the inner face of the retainer ring when an upstream side of the valve is at a higher pressure than the downstream side.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense.

BRIEF DESCRIPTION OF THE FIGURES

The disclosed technology may be more completely understood and appreciated in consideration of the following detailed description in connection with the accompanying figures in which.

While embodiments herein are susceptible to various modifications and alternative forms, specifics thereof have been shown by way of example and figures, and will be described in detail. It should be understood, however, that the scope herein is not limited to the particular examples described. On the contrary, the intention is to cover modifications, equivalents, and alternatives falling within the spirit and scope herein.

DETAILED DESCRIPTION

Figure 1:
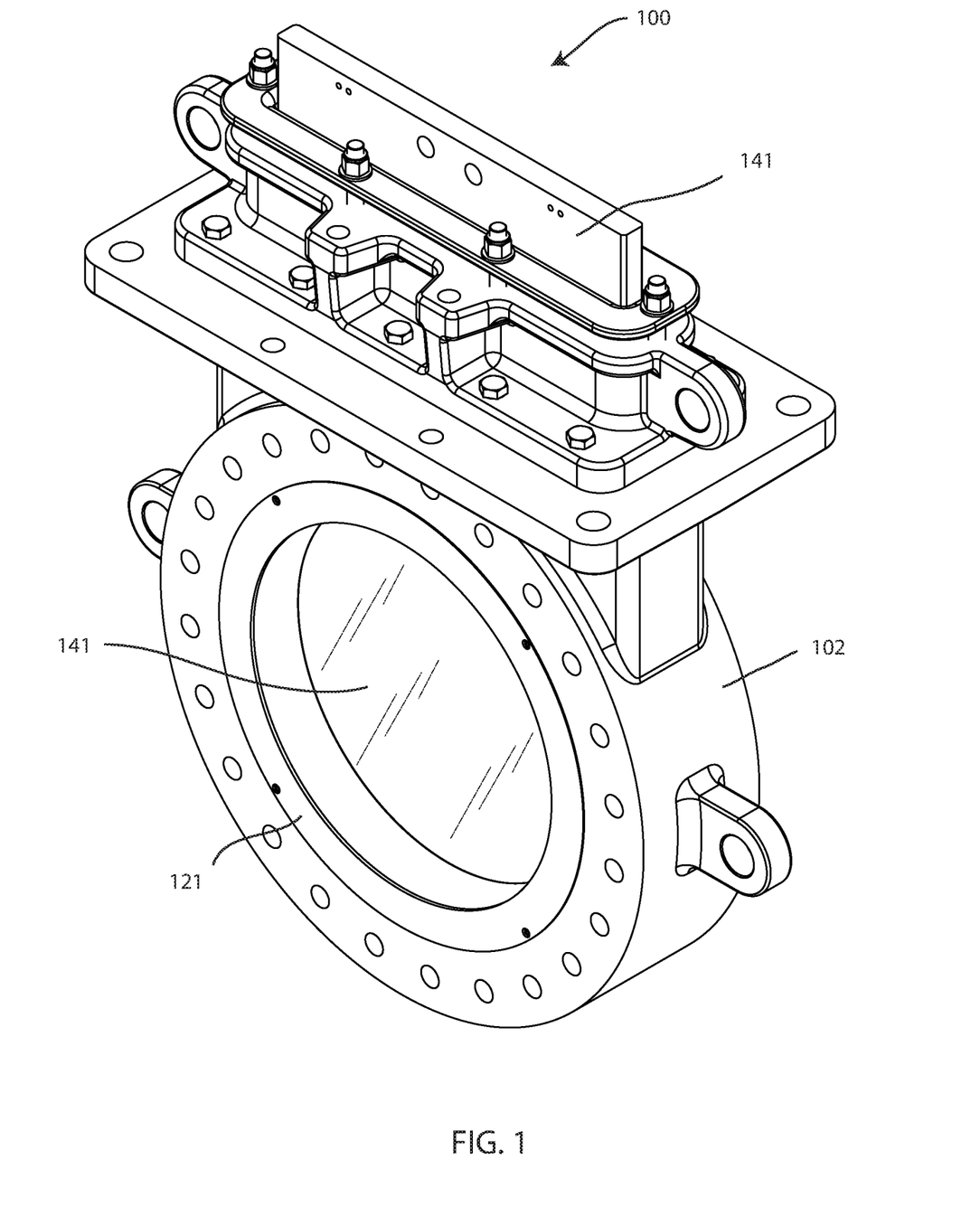
FIG. 1 is a perspective view of a knife gate valve according to some examples.

The disclosed technology provides a valve that includes a valve body with an interior channel, a knife gate that slides in and out of the interior channel, wear rings on the upstream and downstream sides of the valve, and retainer rings disposed adjacent to the gate on the upstream and downstream sides. FIG. 1 is a perspective view of a knife gate valve according to some examples. The valve 100 includes a valve body 102. A wear ring 121 is seated inside of the valve body 102. The wear ring 121 lines and protects the valve body 102 from wear and damage by fluids passing through the valve 100. In the perspective view of FIG. 1, a gate 141 is shown in the closed position. When the gate is closed, as shown in FIG. 1, fluid cannot pass from the upstream to the downstream side of the valve 100.

Valve System

Figure 2A:
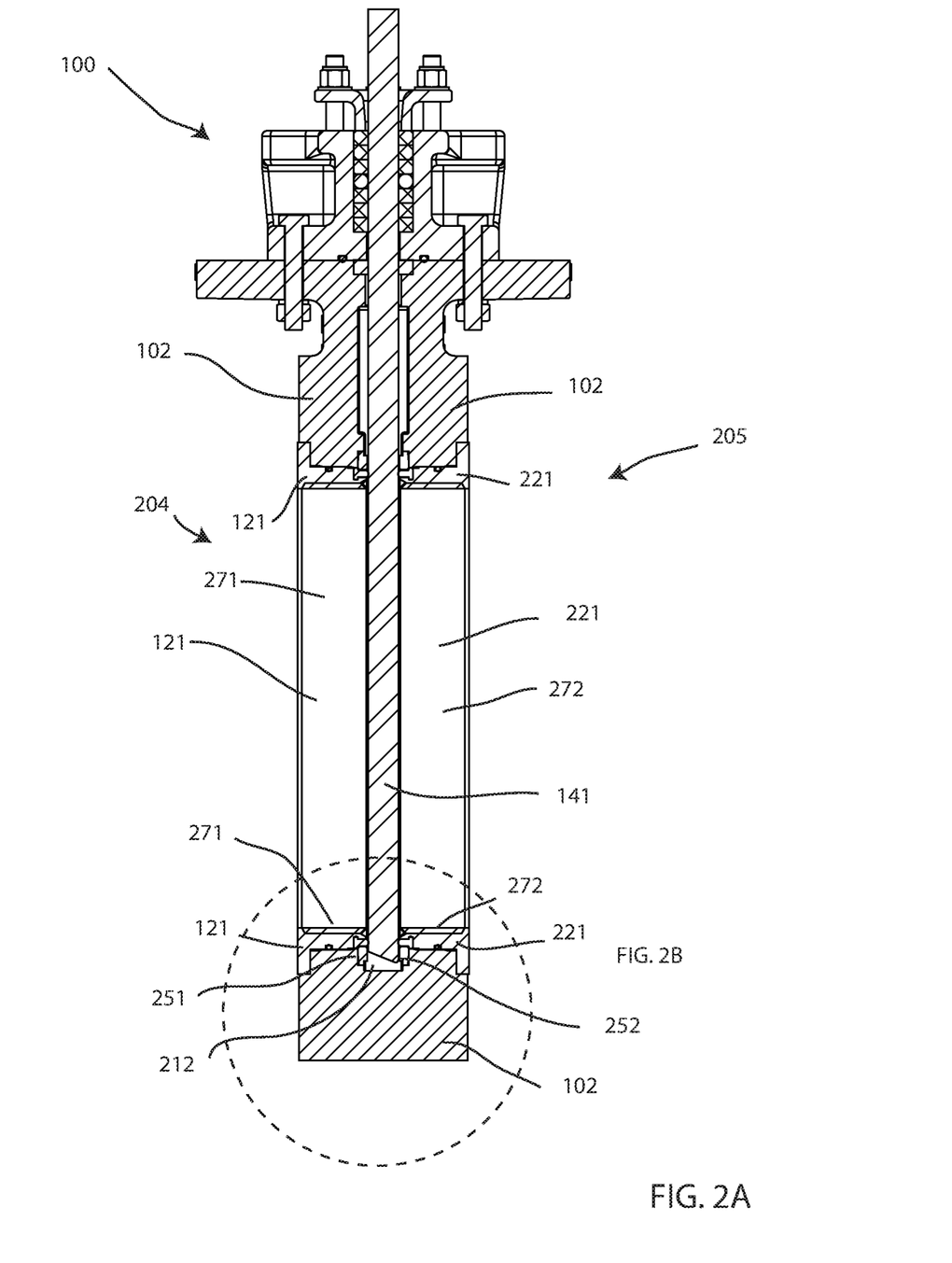
FIG. 2A is a cutaway side view of the knife gate valve according to some examples.
Figure 2B:
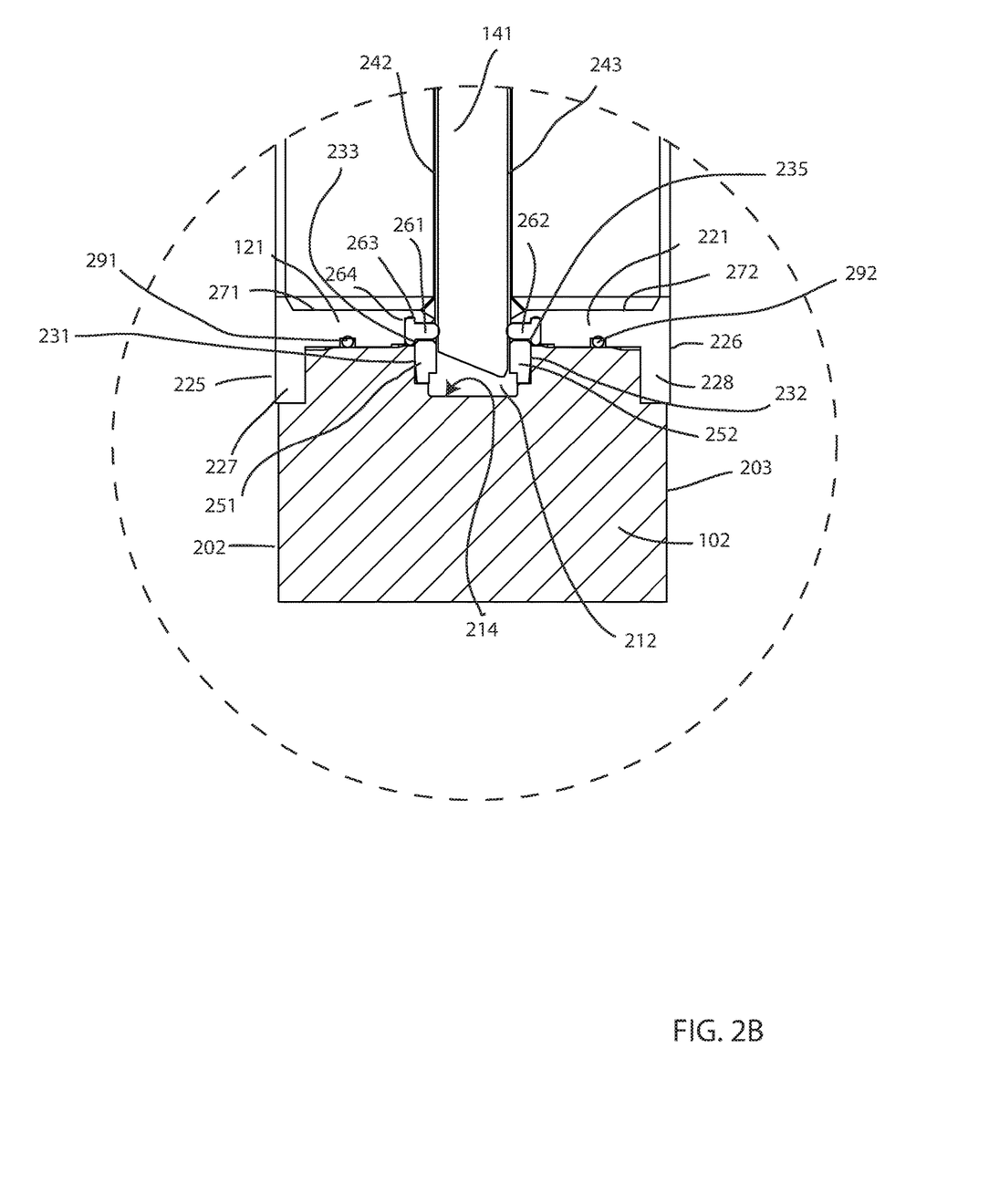
FIG. 2B is an enlarged view of the cross-section of FIG. 2A.

As shown in FIGS. 2A-2B, the valve 100 has a valve body 102. The valve body 102 has a center bore that encloses a fluid flow path through the valve body 102. An interior channel 212 in the valve body 102 has a channel surface 214 (see FIG. 2B), a first annular sidewall 231, and a second annular sidewall 232. The knife gate 141 is configured to be received into the channel 212. The valve 100 further includes a first wear ring 121 on a downstream side 204 of the valve 100 and a second wear ring 221 on an upstream side 205 of the valve 100. The wear rings 121, 221 are disposed inside the center bore of the valve body 102. The inner surface of the valve body 102 engages the outer surface of the wear rings 121, 221. The wear rings 121, 221 provide a barrier between the surface of the center bore and the fluid flow path. It should be understood that because fluid can flow in either direction through the valve 100, the side 204 could alternatively be the upstream side, in which case the side 205 would be the downstream side. The wear rings 121, 221 are generally constructed of a more durable material than the valve body 102, often a harder material that can withstand abrasion better than the material forming the valve body 102. For example, the valve body 102 may be formed of a first grade of stainless steel while the wear rings 121 and 221 are formed of a different grade of steel or a different alloy or metal (such as a cast iron). The valve bodies can be made of various materials, including steel and stainless steel, but other metals can be used for the valve and its components. The valve body and components can be formed using various manufacturing techniques, including but not limited to casting or fabrication. The size of the valve can be relatively small, medium, or large; typically from about 2" interior open diameter to 60" interior open diameter.

The wear rings 121, 221 each have a flange 227, 228 on an outer face 225, 226 of the wear ring, the flange extending the diameter of the wear ring on its outer surface. Each flange abuts an outer face 202, 203 of the valve body 102 (such as a recess in the valve body) to prevent the wear rings 121, 221 from advancing toward the gate 141. Thus, the flanges 227, 228 control the depth of the wear rings into the valve body. In certain embodiments the flanges 227, 228 ensure that there is a slight gap between the inner face of the wear rings 121, 221 and the gate surfaces when the gate is in a lowered position. This gap can be, for example just small enough so that the gate does not apply pressure to wear ring (since the retainer rings make contact with the gate and retain it in place), rather than the wear rings performing this function. In the example of FIGS. 2A and 2B, the valve body 102 has a first recess forming the first outer face 202, and a second recess forming the second outer face 203. The first flange 227 abuts the first recess, and the second flange 228 abuts the second recess. These grooves have a wider diameter than the center bore to accommodate the flanges of the wear rings.

The valve 100 has a first retainer ring 251 and a second retainer ring 252 that are configured to engage and retain the gate and to provide dead-end service to the valve 100. In the example of the Figures, the retainer rings 251, 252 are positioned in the interior channel of the valve body 102 between the valve body 102 and the gate 141. The retainer rings 251, 252 each have an outer face abutting a sidewall of the channel 212 and an inner face that abuts the gate 141 when the gate 141 is in a closed position. The gate 141 thus does not typically come into contact with the valve body 102, which prevents wear on the valve body 102.

In the example of FIGS. 2A-2B, the gate 141 is closed. When the upstream side 205 of the valve 100 is pressurized and the downstream side 204 is not pressurized, the retainer ring 251 counters the force of the gate face 242 pressing on the inner face of the retainer ring 251. In this state, the retainer ring 251 is able to hold the gate 141 in place even without an additional force on the other side of the gate 141, such that the valve may function in a dead-end mode. Similarly, when the side 204 of the valve 100 is pressurized and the opposite side 205 is not pressurized, the retainer ring 252 is configured to counter the force of the gate face 243, which presses on the inner face of the retainer ring 252. In this state, the retainer ring 252 is able to hold the gate 141 in place.

The valve 100 further has a first seal 261 adjacent to the first retainer ring 251, and a second seal 262 adjacent to the second retainer ring 252 (See FIG. 2B). The seals 261, 262 each have an inner face that engages the gate 141 to form a seal when the gate 141 is in the closed position. In some examples, the first and second seals 261, 262 are T-seat rings, with the "bottom" of the "T" oriented inward toward the gate, and the "top" of the "T" oriented outward toward the wear ring (with the "T" being on its side). This construction has the wear ring partially surrounding the end of the seals 261, 262 to prevent the seals from migrating into the channel 212.

In the example of FIGS. 2A-2B, the seal 261 is positioned between the first wear ring 121 and the first retainer ring 251 in such a way that the wear ring 121 and the retainer ring 251 do not touch. Likewise, the seal 262 is positioned between the second wear ring 221 and the second retainer ring 252. The T-seats in the example of FIGS. 2A and 2B are seated in a groove in an exterior annular surface of the wear ring. In addition, the inner diameter of the retainer rings 251, 252 can be slightly less than the inner diameter of the adjacent portion of the valve body (toward the exterior), to provide an edge or corner 233, 235 that can further help secure the first and second seals 261, 262. In this manner the seals 261, 262 make contact with the wear rings, the body, and the retainer rings; with a small portion extending toward the channel 212 so as to make a seal with the gate when it descends into the channel 212. It will also be understood that in some configurations the seals 261, 262 only make contact with wear rings and the retainer rings.

The seals 261, 262 can provide a bubble-tight seal, preventing fluid flow through the valve 100 when the valve is closed. In some examples, the valve 100 can include additional O-rings 291, 292 between the wear rings and the valve body. In the example of FIG. 2B, the O-rings 291, 292 are seated in grooves in the wear rings 121, 221. In alternative examples, O-rings could be seated in the valve body 102 instead of in the wear rings.

Valve Body

Figure 3:
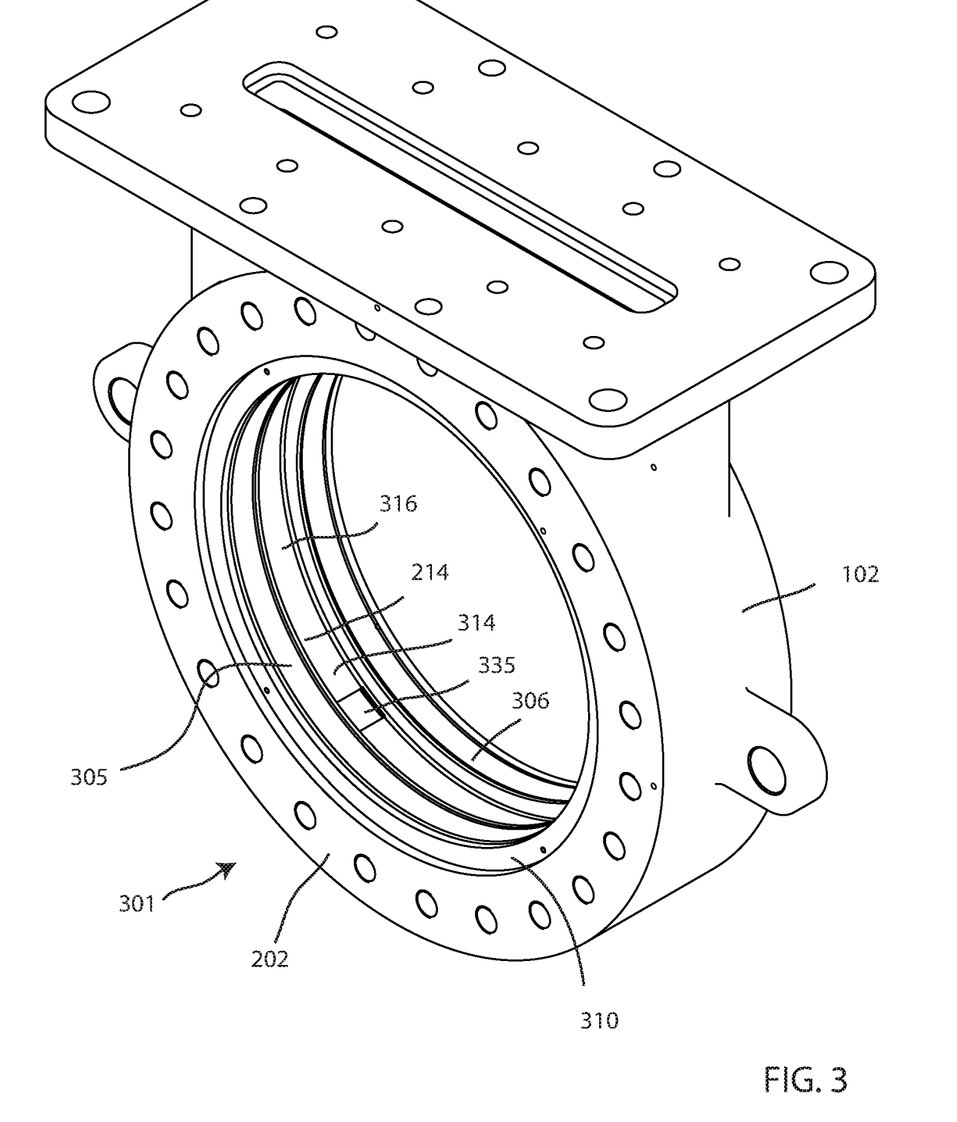
FIG. 3 is a perspective view of the valve body according to some examples.
Figure 4:
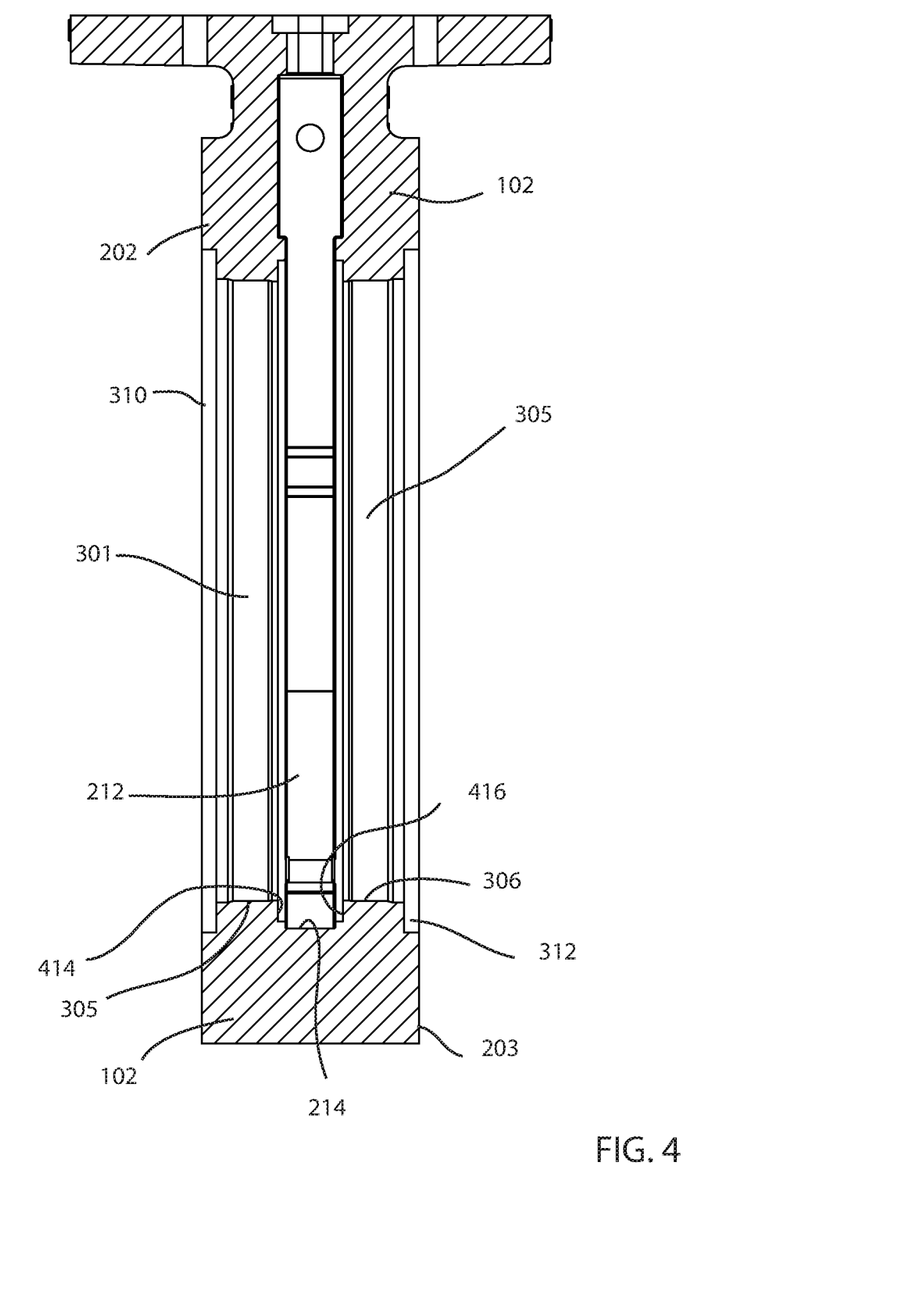
FIG. 4 is a cutaway view of a valve body according to some examples.
Figure 5:
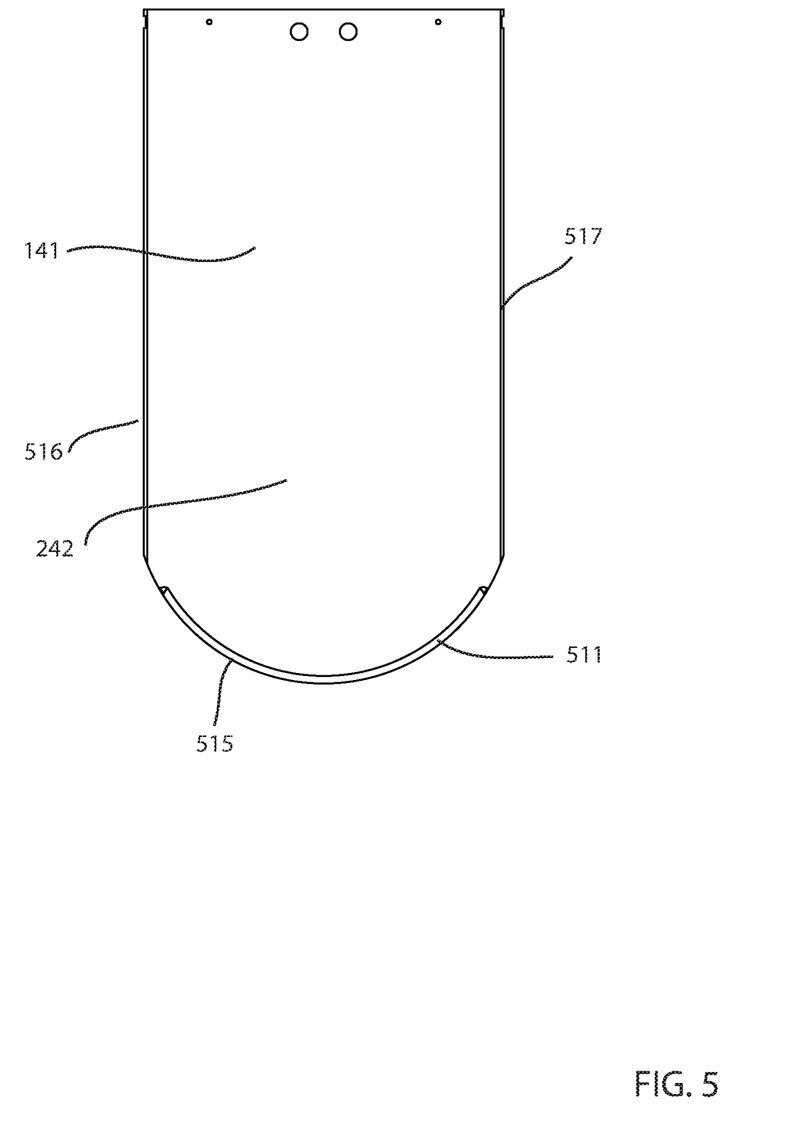
FIG. 5 is a front view of a gate for a knife gate valve according to some examples.

As seen more clearly in FIGS. 3 and 4, the valve body 102 has a center bore 301 enclosing a fluid flow path. Fluid can flow in either direction through the valve 100. The fluid flow path is blocked by the gate 141 (see FIG. 1 and FIG. 5) when the gate 141 is closed, so the gate 141 prevents fluid flow through the valve 100. The center bore 301 has a first bore surface 305 and a second bore surface 306 that define an inner radius of the center bore 301. The bore surfaces 305, 306 engage the exterior annular surface of the wear rings 121, 221.

The valve body 102 has a first outer face 202 and a second outer face 203. In some examples, the valve body 102 has a groove 310 in the first outer face 202 and a groove 312 in the second outer face 203. The groove 310 engages the flange 227 of the first wear ring 121, and the groove 312 engages the flange 228 of the second wear ring 221. The grooves 310, 312 prevent the wear rings 121, 221 from advancing too far into the center of the valve body 102. In some examples, the wear rings 121, 221 are prevented from contacting the first and second faces 242, 243 of the gate 141 by the first and second flanges 227, 228.

The channel 212 provides a slot through which the gate 141 can slide. The channel 212 has a channel surface 214 that defines an inner radius of the channel. In some examples, the channel surface 214 includes an annular surface portion 314 near the bottom of the valve body 102, and a planar surface portion 316 on the sides of the valve body 102. The channel surface 214, which is defined by the annular surface portion 314 and the planar surface 316, may conform approximately to the shape of the knife gate 141.

The channel 212 has a first annular side wall 414 on the downstream side 204 of the valve 100, and a second annular sidewall 416 on the upstream side 205 of the valve 100. An outer face of the retainer ring 251 abuts the first annular sidewall 414 and an outer face of the retainer ring 252 abuts the second annular sidewall 416. The sidewalls 414, 416 support the force of the retainer rings 251, 252.

In some examples, one or more tabs 335 are provided in the channel 212. The tabs 335 may be machined into the valve body 102. The tabs 335 engage with grooves in the exterior annular surface of the retainer rings 251, 252 to prevent the retainer rings 251, 252 from advancing into the center of the channel 212 when the gate 141 is open. In some examples, the valve body 102 can have a first tab 335 and a second tab, and each of the tabs can be situated in the annular surface portion 214 of the channel 212.

Gate

Figure 6:
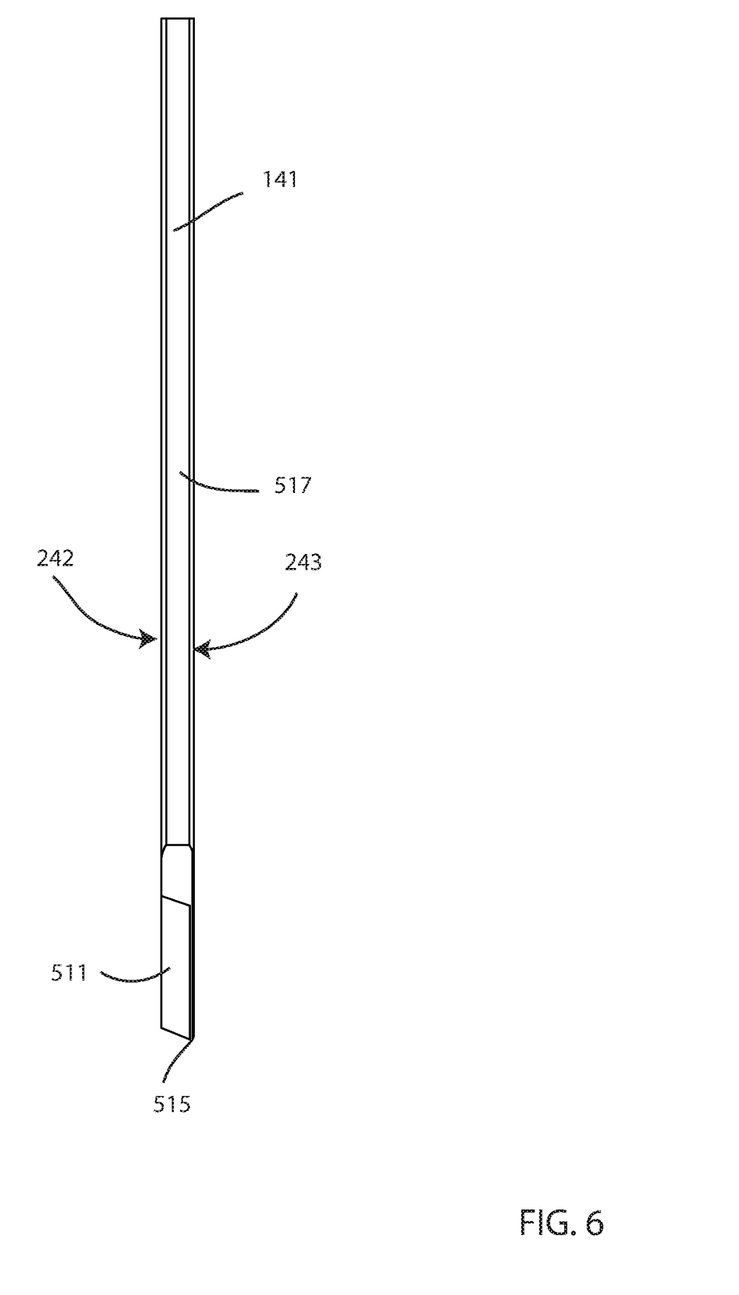
FIG. 6 is a side view of a portion of the gate of FIG. 5.

The gate 141 separates the upstream side and the downstream side of the valve 100. The gate is configured to slide into and out of the channel 212 in the valve body 102. As seen more clearly in FIGS. 5-6, the gate 141 has a first face 242 and a second face 243 opposite the first face 242. The gate 141 further has a knife edge 511 along a bottom annular edge 515 of the gate 141. The gate 141 has a first side edge 516 and a second side edge 517. When the gate 141 is closed, the first side edge 516 is adjacent to the planar surface 316 of the valve body 102, and the second side edge 517 is adjacent to a second planar surface in the channel 212 of the valve body 102. The bottom annular edge 515 extends far enough into the interior channel 212 so that the first face 242 contacts the entire inner face of the retainer ring 251.

Wear Rings

Referring to FIGS. 2, 3, 7, and 9A-B, the first wear ring 121 has an interior annular surface 271, and the second wear ring 221 has an interior annular surface 272. In the example of the figures, the wear rings each have a uniform interior annular surface 271, 272 and a non-uniform exterior annular surface 771, 772. This nonuniformity of the exterior annular surfaces 771, 772 exists because these surfaces have one or more grooves configured to engage with other components of the valve 100. The wear ring 121 has a seating surface 704 that abuts the center bore surface 305 of the valve body 102. Optionally, a groove 706 in the seating surface 704 is configured to receive an O-ring 291 that creates a seal between the wear ring 121 and the valve body 102. A groove 708 can be provided in the exterior annular surface 771. The groove 708 seats the seal 261. In some examples, the groove 708 is sized and shaped to receive a T-seal. The wear ring 121 has an inner face 725 opposite the outer face 225. The wear ring 221 has an inner face 726 opposite the outer face 226.

Figure 7:
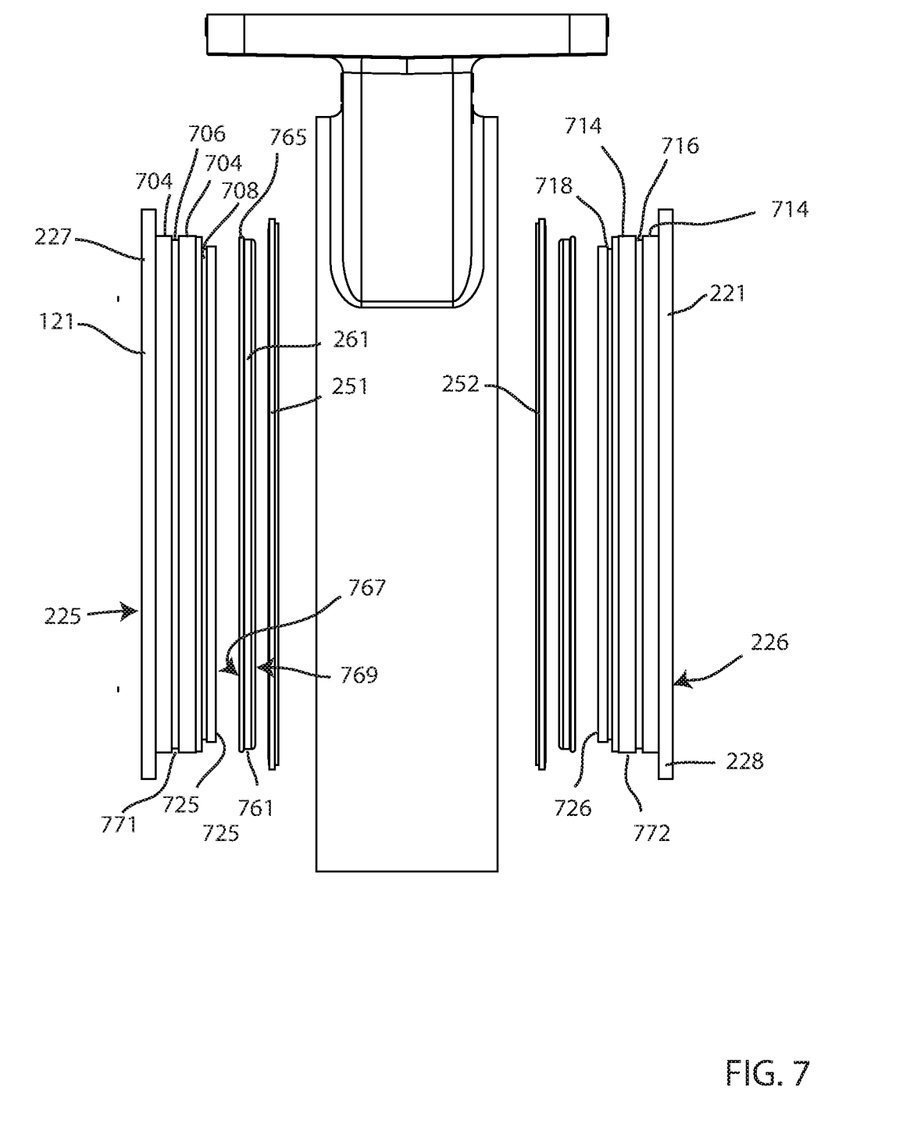
FIG. 7 is an exploded side view of the valve body and rings according to some examples.
Figure 8A:
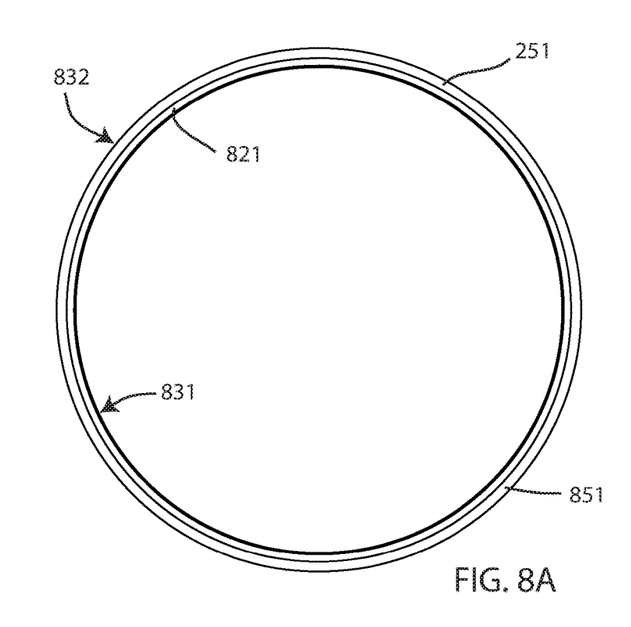
FIG. 8A is a front view of a retainer ring according to some examples.
Figure 8B:
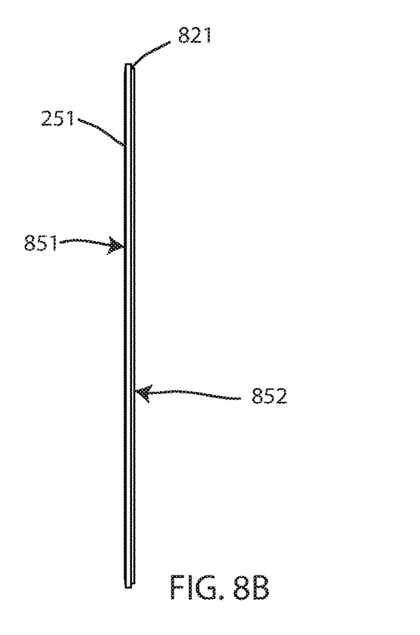
FIG. 8B is a side view of the retainer ring of FIG. 8A.
Figure 9A:
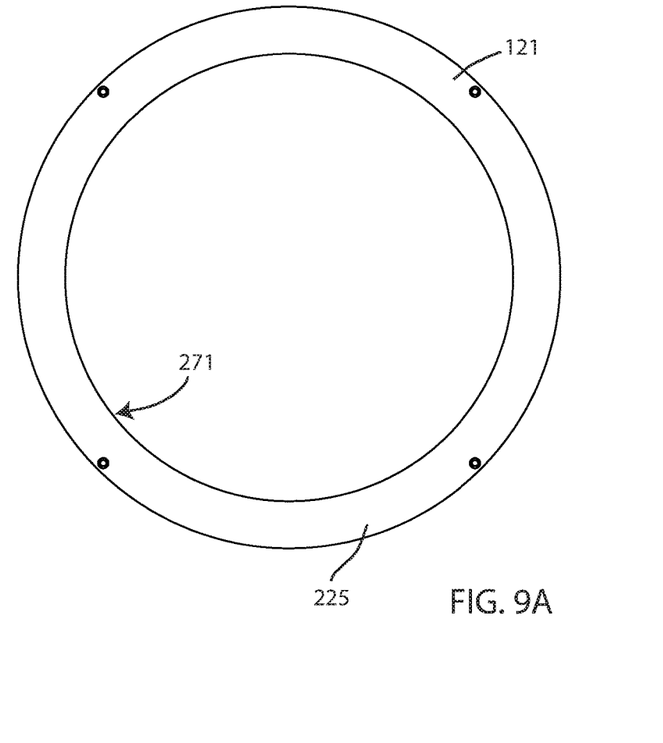
FIG. 9A is a front view of a wear ring according to some examples.
Figure 9B:
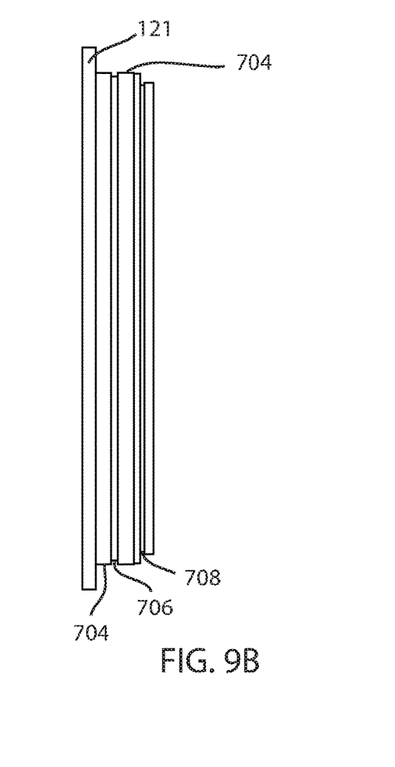
FIG. 9B is a side view of the wear ring of FIG. 9A.

Like the wear ring 121, the second wear ring 221 has a seating surface 714 that abuts the center bore surface 306 of the valve body 102, a groove 716 in the seating surface 714 configured to receive an O-ring 292, and a groove 718 configured to seat the seal 262.

Retainer Rings

Referring to FIGS. 2A, 2B, 7, 8A, and 8B, the retainer ring 251 has an outer face 851 that abuts the sidewall 231 of the channel 212, and an inner face 852 configured to abut the gate face 242. The retainer ring 251 has an interior annular surface 831 defining an inner radius of the retainer ring 251, and an exterior annular surface 832 that defines an outer radius of the retainer ring 251. In the example of the figures, the retainer rings each have a uniform interior annular surface and a non-uniform exterior annular surface. This nonuniformity of the exterior annular surfaces exists because these surfaces have one or more grooves configured to engage with other components of the valve 100. In some examples, the retainer ring 251 has a groove 821 in the exterior annular surface 832. The groove 821 can be retained by the tab 335 to prevent the retainer ring 251 from sliding into the center of the channel 212.

T-Seat

In the example of the figures, the seal 261 is a T-seat disposed between the wear ring 121 and the retainer ring 251 such that the wear ring 121 and the retainer ring 251 do not touch, with the T-seat separating them. The wear ring 121 and the retainer ring 251 are thereby isolated from each other. In some examples, the seal 261 has an exterior annular surface 761 defining an outer radius of the seal 261 and an interior annular surface 263 defining an inner radius of the seal 261. The interior annular surface 263 is configured to engage the exterior annular surface 771 of the wear ring 121. In some examples, the seal 261 has a flange 264 to engage with the groove 708. The seal 261 may also have a flange 765 opposite the flange 264. In the example of the Figures, the flange 765 is seated in a depression between the valve body 102 and the retainer ring 251. In this way, the seal 261 is held in place by the wear ring 121 and the retainer ring 251, which allows the seal 261 to be at approximately a constant distance from the gate 141.

The seal 261 has an outer face 767 that abuts the exterior surface 771 of the wear ring 121. The seal 261 also has an inner face 769 that is configured to engage the face 242 of gate 141 to create a bubble-tight seal to prevent fluid flow through the valve when the gate 141 is closed.

Definitions

As used herein, an "interior annular surface" refers to the annular portion of a ring that defines the inner radius of the ring.

As used herein, an "exterior annular surface" refers to the annular portion of a ring that defines the outer radius of the ring.

As used herein, an "outer face" refers to a portion of an annular ring that faces the outside of the valve. An outer face may lie in a plane.

As used herein, an "inner face" refers to a portion of an annular ring that faces into the center of the valve, i.e., toward the gate. An inner face may lie in a plane.

A distance between the outer face and the inner face of a ring defines the width of the ring.

It should be noted that, as used in this specification and the appended claims, the singular forms include the plural unless the context clearly dictates otherwise. It should also be noted that the term "or" is generally employed in its sense including "and/or" unless the content clearly dictates otherwise.

All publications and patent applications referenced in this specification are herein incorporated by reference in their entirety.

The invention has been described with reference to various specific and preferred embodiments and techniques. However, it should be understood that many variations and modifications may be made while remaining within the spirit and scope of the invention.

What is claimed is:

1. A knife gate valve comprising:
a valve body having a center bore through which fluids can flow, the center bore divided by an interior channel configured to receive a movable gate, the movable gate configured to travel along the interior channel to open and close the center bore to fluid flow; the movable gate defining an upstream side of the center bore and a downstream side of the center bore;
the movable gate disposed in the interior channel;
a removable first wear ring disposed on the upstream side of the center bore, the removable first wear ring substantially lining the upstream side of the center bore; and
a removable second wear ring disposed on the downstream side of the center bore, the removable second wear ring substantially lining the downstream side of the center bore;
a first retainer ring adjacent to the movable gate on the upstream side of the knife gate valve;
a second retainer ring adjacent to the movable gate on the downstream side of the knife gate valve; and
a first seal disposed between the removable first wear ring and the first retainer ring, wherein the first seal isolates the removable first wear ring from the first retainer ring;
wherein the first retainer ring is seated along a first sidewall of the interior channel and the second retainer ring is seated along a second sidewall of the interior channel; and
wherein the removable first wear ring and the removable second wear ring are substantially rigid.

2. The knife gate valve of claim 1, wherein the first and second retainer rings are configured to provide dead-end service to the knife gate valve such that the upstream side of the knife gate valve is under pressure and the downstream side of the knife gate valve is open to atmosphere.

3. The knife gate valve of claim 1, wherein the removable second wear ring is removable from the knife gate valve without removal of the first retainer ring or the second retainer ring.

4. The knife gate valve of claim 1, wherein the removable first wear ring further comprises an outward-facing flange configured to prevent the removable first wear ring from touching the movable gate.

5. The knife gate valve of claim 1, wherein the interior channel further comprises at least one tab.

6. The knife gate valve of claim 1, wherein at least one of the first retainer ring and second retainer ring are retained in the interior channel by at least one tab disposed between the at least one of the first retainer ring and second retainer ring and the movable gate.

7. The knife gate valve of claim 1, further comprising a first T-seat situated between the removable first wear ring and the first retainer ring and a second T-seat situated between the removable second wear ring and the second retainer ring.

8. A knife gate valve comprising:
a valve body having:
a center bore with a center bore surface, the center bore enclosing a fluid flow path through the valve body, and
an interior channel in the valve body, the interior channel having a channel surface and first and second annular sidewalls;
a knife gate configured to be received into the interior channel of the valve body;
a wear ring disposed inside the center bore, the wear ring providing a barrier between the center bore surface and the fluid flow path, wherein the wear ring is substantially rigid; and
a retainer ring having an outer face abutting one of the first and second annular sidewalls of the interior channel,
an inner face that abuts the knife gate when the knife gate is in a closed position; and
a seal disposed between the wear ring and the retainer ring, wherein the seal isolates the wear ring from the retainer ring.

9. The knife gate valve of claim 8, wherein the knife gate valve comprises a first retainer ring and a first wear ring on an upstream side of the knife gate and a second retainer ring and a second wear ring on a downstream side of the knife gate.

10. The knife gate valve of claim 8 wherein the wear ring further comprises a flange on an outer face of the wear ring, and wherein the flange abuts an outer face of the valve body to prevent the wear ring from advancing toward the knife gate.

11. The knife gate valve of claim 8, wherein the center bore surface engages an exterior annular surface of the wear ring.

12. The knife gate valve of claim 8, wherein the wear ring has an interior annular surface defining a uniform inner radius of the wear ring and an exterior annular surface defining a non-uniform outer radius of the wear ring.

13. The knife gate valve of claim 8 wherein the channel surface includes an annular portion, a first planar portion adjacent to the annular portion, and a second planar portion adjacent to the annular portion.

14. The knife gate valve of claim 8 wherein the retainer ring has an exterior annular surface defining at least one groove.

15. The knife gate valve of claim 8 wherein the wear ring further comprises:
 - an annular seating surface that abuts the center bore surface, and
 - a groove in the annular seating surface configured to retain a seal between the annular seating surface and the center bore surface.

16. The knife gate valve of claim 8, wherein the retainer ring is positioned on a downstream side of the knife gate valve, and the inner face of the retainer ring is configured to counter a force of a knife gate surface pressing on the inner face of the retainer ring when an upstream side of the knife gate valve is at a higher pressure than the downstream side.

17. The knife gate valve of claim 8, wherein the seal is a T-seat that is seated in a groove in an exterior annular surface of the wear ring.

18. The knife gate valve of claim 17, wherein the seal is a T-seat that is positioned between the wear ring and the retainer ring such that the wear ring and the retainer ring do not touch.

\* \* \* \* \*